(12) United States Patent
Lin et al.

(10) Patent No.: US 9,251,594 B2
(45) Date of Patent: Feb. 2, 2016

(54) CROPPING BOUNDARY SIMPLICITY

(71) Applicant: Adobe Systems Incorporated, San Jose, CA (US)

(72) Inventors: Zhe Lin, Fremont, CA (US); Radomir Mech, Mountain View, CA (US); Xiaohui Shen, San Jose, CA (US); Chen Fang, Hanover, NH (US)

(73) Assignee: Adobe Systems Incorporated, San Jose, CA (US)

( * ) Notice: Subject to any disclaimer, the term of this patent is extended or adjusted under 35 U.S.C. 154(b) by 80 days.

(21) Appl. No.: 14/169,025

(22) Filed: Jan. 30, 2014

(65) Prior Publication Data

US 2015/0213612 A1    Jul. 30, 2015

(51) Int. Cl.
    *G06K 9/34*     (2006.01)
    *G06T 7/00*     (2006.01)

(52) U.S. Cl.
    CPC ..... *G06T 7/0085* (2013.01); *G06T 2207/10004* (2013.01); *G06T 2207/20132* (2013.01)

(58) Field of Classification Search
None
See application file for complete search history.

(56) References Cited

U.S. PATENT DOCUMENTS

| 2002/0191861 | A1* | 12/2002 | Cheatle | 382/282 |
|---|---|---|---|---|
| 2006/0023077 | A1* | 2/2006 | Alton et al. | 348/222.1 |
| 2006/0072847 | A1* | 4/2006 | Chor et al. | 382/282 |
| 2006/0188173 | A1* | 8/2006 | Zhang et al. | 382/276 |
| 2009/0278958 | A1* | 11/2009 | Bregman-Amitai et al. | 348/231.99 |
| 2010/0329550 | A1* | 12/2010 | Cheatle | 382/165 |
| 2013/0021512 | A1 | 1/2013 | Patuck et al. | |
| 2013/0107073 | A1 | 5/2013 | Mishra et al. | |
| 2015/0116350 | A1* | 4/2015 | Lin et al. | 345/620 |

OTHER PUBLICATIONS

"Gaze Based Interaction for Semi-Automatic Photo Cropping" Proceedings of the SIGCHI Conference on Human Factors in Computing Systems pp. 2006.*
"Corrected Notice of Allowance", U.S. Appl. No. 14/169,073, Oct. 5, 2015, 19 pages.
"Notice of Allowance", U.S. Appl. No. 14/169,073, Sep. 14, 2015, 13 pages.
"Pre-Interview Communication", U.S. Appl. No. 14/169,073, Aug. 4, 2015, 4 pages.
Park,"Modeling Photo Composition and its Application to Photo Re-arrangement", 19th IEEE International Conference on Image Processing (ICIP), Sep. 30, 2012, 4 pages.
"Corrected Notice of Allowance", U.S. Appl. No. 14/169,073, Nov. 12, 2015, 4 pages.

* cited by examiner

*Primary Examiner* — Sean Motsinger
(74) *Attorney, Agent, or Firm* — Wolfe-SBMC

(57) ABSTRACT

Cropping boundary simplicity techniques are described. In one or more implementations, multiple candidate croppings of a scene are generated. For each of the candidate croppings, a score is calculated that is indicative of a boundary simplicity for the candidate cropping. To calculate the boundary simplicity, complexity of the scene along a boundary of a respective candidate cropping is measured. The complexity is measured, for instance, using an average gradient, an image edge map, or entropy along the boundary. Values indicative of the complexity may be derived from the measuring. The candidate croppings may then be ranked according to those values. Based on the scores calculated to indicate the boundary simplicity, one or more of the candidate croppings may be chosen e.g., to present the chosen croppings to a user for selection.

20 Claims, 8 Drawing Sheets

CROPPING BOUNDARY SIMPLICITY

BACKGROUND

Cropping is one of the most frequently performed tasks in photograph processing. Generally, the goal of cropping is to select a sub-region of a given image that is visually more pleasing than the image as a whole, e.g., a sub-region of the image considered well-composed. To select a more visually pleasing sub-region of an image, a user may consider several visual characteristics of the sub-region. However, users who are not familiar with "the rules" of photography, when those rules may be broken, and/or do not know which characteristics to consider for cropping an image, may have difficulty selecting a sub-region that is more visually pleasing than the image as a whole. As a result, a user may select a sub-region that results in a cropping that is not visually pleasing.

SUMMARY

Cropping boundary simplicity techniques are described. In one or more implementations, multiple candidate croppings of a scene are generated. For each of the candidate croppings, a score is calculated that is indicative of a boundary simplicity for the candidate cropping. To calculate the boundary simplicity, complexity of the scene along a boundary of a respective candidate cropping is measured. The complexity is measured, for instance, using an average gradient, an image edge map, or entropy along the boundary. Values indicative of the complexity may be derived from the measuring. The candidate croppings may then be ranked according to those values. Based on the scores calculated to indicate the boundary simplicity, one or more of the candidate croppings may be chosen e.g., to present the chosen croppings to a user for selection.

Those croppings of a scene that are chosen may be suggested to a user through a user interface. Through the user interface, a user may select a suggested cropping to apply the cropping to the scene. In one or more implementations, the user interface may be part of an image editing application that allows a user to access stored images and apply the suggested croppings to a stored image. The user interface may also display the scene in real-time and enable selection of a suggested cropping to capture the scene according to the selected cropping.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
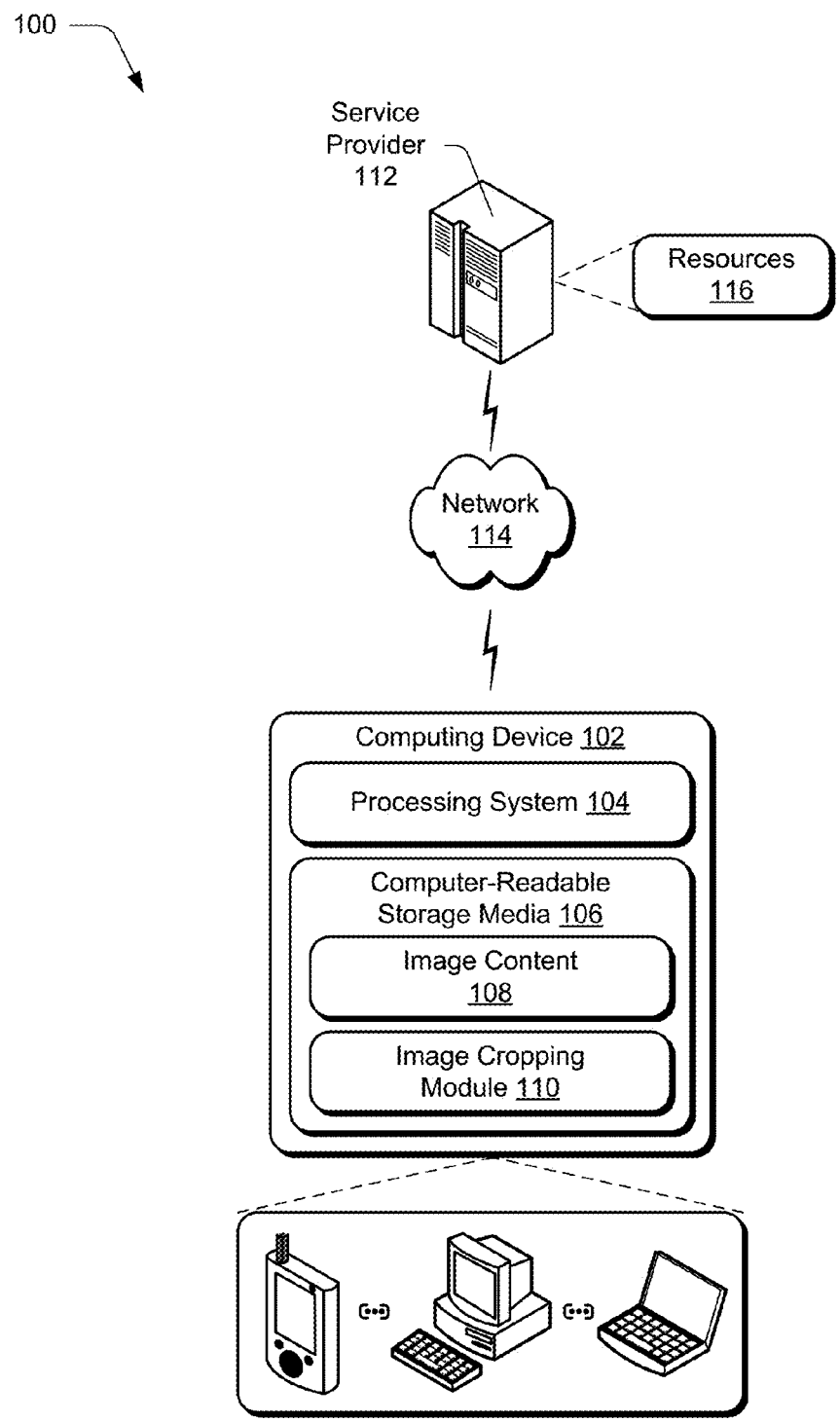
FIG. 1 is an illustration of an environment in an example implementation that is operable to employ techniques described herein.

Conventional techniques for cropping images may be time consuming for a user. Even if a user is willing to spend time manually cropping their photos, if the user is not familiar with "the rules" of photography, when those rules may be broken, and/or does not know what visual characteristics to consider when cropping an image, the resulting images may not be visually pleasing.

Cropping boundary simplicity techniques are described. In one or more implementations, a variety of image characteristics may be used to suggest candidate croppings of an image to a user. For example, a measure of boundary simplicity may be used to suggest candidate croppings of an image. In general, images that are considered to be visually pleasing have the characteristics that they are "well-composed" (e.g., generally adhere to "rules" of photography), preserve content of the image that is determined to be important, and have a boundary that is simpler than other potential boundaries (e.g., cuts through fewer objects). Accordingly, multiple croppings of an image may be analyzed with regard to such characteristics to determine how visually pleasing a particular cropping is relative to the other croppings.

For example, a boundary simplicity score may be calculated for a particular cropping that indicates how simple the boundary of the cropping is compared to other candidate croppings. Further, a composition score may be calculated that indicates a composition quality for a particular cropping. A score may also be calculated for a particular cropping that indicates how much of the salient content of the original image is preserved in the cropping. These scores may then be combined to generate an overall score for each candidate cropping.

Based on the scores for the candidate croppings, some of the croppings may be chosen to suggest to a user. To suggest the chosen croppings, a user interface may display cropping windows over an image that each correspond to a suggested cropping. In suggesting croppings for a scene that has yet to be captured, the cropping windows may be displayed over a portion of the interface through which the scene is viewed in real-time. In any case, a user may select a suggested cropping though the user interface. Responsive to the selection, the image may be cropped according to the selected cropping. When the selection is performed relative to a scene that has yet to be captured, the scene may be captured according to the selected cropping.

Cropping boundary simplicity techniques may also have a variety of other applications, such as to rate photographs taken by a user, to search for images that are similar (e.g., according to the parameters mentioned above), and so on.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102 having a processing system 104 that may include one or more processing devices (e.g., processors) and one or more computer-readable storage media 106. The illustrated environment 100 also includes image content 108 and an image cropping module 110 embodied on the computer-readable storage media 106 and operable via the processing system 104 to implement corresponding functionality described herein. In at least some implementations, the computing device 102 may include functionality to access various kinds of web-based resources (content and services), interact with online providers, and so forth as described in further detail below.

The computing device 102 may be configured as any suitable type of computing device. For example, the computing device 102 may be configured as a server, a desktop computer, a laptop computer, a mobile device (e.g., assuming a handheld configuration such as a tablet or mobile phone), a tablet, a camera (point-and-shoot, single lens reflex (SLR), video recorder, and so on), a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 8.

The environment 100 further depicts one or more service providers 112, configured to communicate with computing device 102 over a network 114, such as the Internet, to provide a "cloud-based" computing environment. Generally speaking, service providers 112 are configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, photo printing services (e.g., Snapfish®, Shutterfly®, and the like), photo storage and/or sharing services (e.g., Flickr®), social network services (e.g., Facebook®, Twitter®, Instagram®, and the like), and so forth.

These sources may serve as significant amounts of image content. Such image content may be formatted in any of a variety of image formats, including but not limited to JPEG, TIFF, RAW, GIF, BMP, PNG, and so on. The image content made available through the services may be posted by users that have accounts with those services. For example, a user having an account with a photo storage and/or sharing service may upload images, such as those taken with a digital camera of the user, or those sent to the user via electronic means. A user of the photo storage and/or sharing service may then share their uploaded images with others, such as by providing a link to photo albums or to a profile of the user.

The image cropping module 110 may represent functionality to implement cropping boundary simplicity techniques as described herein. For example, the image cropping module 110 may be configured in various ways to suggest image croppings of the image content 108 that are more visually pleasing than an original image. To do so, the image cropping module 110 may first score multiple candidate croppings of an image according to parameters that are indicative of visual characteristics of the candidate croppings. Images that are already determined to be visually pleasing are used to establish these visual characteristics. For example, at least some of the visual characteristics may be established by analyzing a collection of images that have been predefined as being visually pleasing. In contrast to conventional techniques which hardcode rules into a cropping algorithm, the image cropping module 110 may establish at least some of the visual characteristics using machine-learning techniques.

The characteristics of visually pleasing images may include that those images are well-composed, they preserve salient content appearing in the captured scene, and have relatively simple boundaries. Accordingly, the parameters for which croppings are scored may include a parameter that indicates a composition quality of a respective cropping, one that indicates whether salient content of the image is preserved by a respective cropping, and another that indicates a simplicity of a boundary of a respective cropping. The image cropping module 110 may also be configured to combine the scores for a cropping into a single score, which may enable image croppings to be compared one to another.

Once the candidate croppings are scored, the image cropping module 110 may choose which of the candidate croppings are presented to a user. For example, the candidate croppings may be ranked according to the scores, and the highest ranked candidate cropping chosen. Other candidate croppings may also be chosen, such as another candidate cropping that is highly ranked but that, according to the scores over the parameters, is visually different from the highest ranked candidate cropping. In this way, the chosen candidate croppings may be used to suggest a variety of visually different, but visually pleasing (e.g., well-composed), croppings of an image.

Suggested croppings may be presented to a user through a user interface for selection. In a photo-editing application, for instance, the image content 108 (e.g., a digital image) may be accessed from storage and croppings of the image content 108 suggested through the user interface, e.g., by displaying windows over the image that each correspond to a suggested cropping. Through the user interface, the user may select one of the suggested croppings (e.g., one of the windows). As a result of the selection, the corresponding cropping may be applied to the image such that regions of the image outside the selected window are removed or hidden, and those within the window remain.

The image cropping module 110 may be implemented as a software module, a hardware device, or using a combination of software, hardware, firmware, fixed logic circuitry, etc. Further, the image cropping module 110 may be implemented as a standalone component of the computing device 102 as illustrated. In addition or alternatively, the image cropping module 110 may be configured as a component of a web service, an application, an operating system of the computing device 102, a plug-in module, or other device application as further described in relation to FIG. 8.

Having considered an example environment, consider now a discussion of some example details of the techniques for cropping boundary simplicity in accordance with one or more implementations.

Cropping Boundary Simplicity Details

Figure 2:
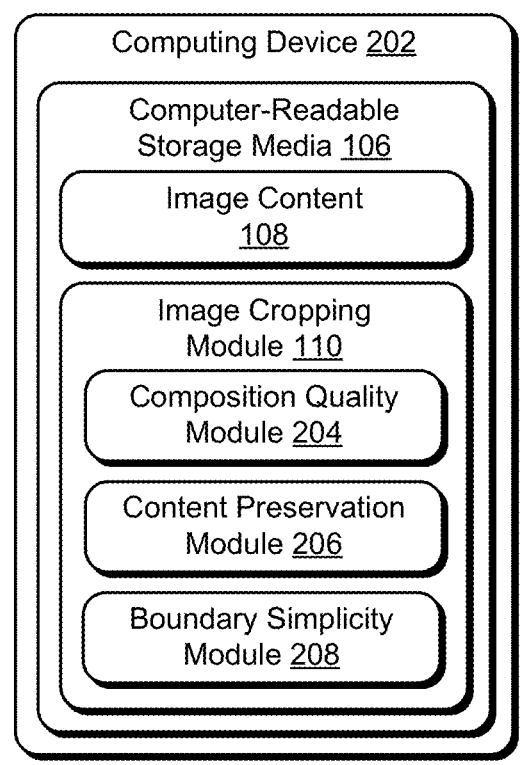
FIG. 2 illustrates from the environment of FIG. 1 a computing device having an image cropping module in greater detail.

This section describes some example details of cropping boundary simplicity techniques in accordance with one or more implementations. FIG. 2 depicts generally at 200 some portions of the environment 100 of FIG. 1, but in greater detail. In particular, the computer-readable storage media 106 of a computing device and the components included therein are depicted in greater detail.

In FIG. 2, the computer-readable storage media 106 is illustrated as part of computing device 202 and includes the image content 108 and the image cropping module 110. The image cropping module 110 is illustrated with a composition quality module 204, a content preservation module 206, and a boundary simplicity module 208. These modules represent functionality of the image cropping module 110 and it should be appreciated that such functionality may be implemented using more or fewer modules than those illustrated. The discussion of the composition quality module 204, the content preservation module 206, and the boundary simplicity module 208 refer to FIGS. 3-5, which illustrate concepts pertinent to the functionality of those modules.

In general, the image cropping module 110 may employ the composition quality module 204, the content preservation module 206, and the boundary simplicity module 208 to score an image cropping over parameters that are indicative of visual characteristics of the cropping. Prior to scoring the image croppings, however, the image cropping module 110 may derive multiple croppings to be scored.

For a particular image, the image cropping module 110 may derive multiple image croppings at different sizes and aspect ratios. For example, the image cropping module 110 may derive image croppings for commonly used photograph sizes, such as image croppings for 3×5 inches, 4×6 inches, 5×7 inches, and the like. The image cropping module 110 may also derive image croppings for commonly used aspect ratios, such as 4:3, 16:9, 1:1, and the like. Instead of deriving multiple different sized croppings, the image cropping module 110 may derive multiple different image croppings that each have a same size e.g., each of the image croppings may have a size of 3×5 inches. It is to be appreciated that the image cropping module 110 may derive image croppings at sizes and aspect ratios other than those enumerated above without departing from the spirit and the scope of the techniques described herein. With cropping boundary simplicity techniques, the image cropping module 110 may also derive image croppings for a variety of shapes, including rectangles (e.g., at the sizes and aspect ratios mentioned above), circles, triangles, ovals, and other different shapes.

Further, the image cropping module 110 may derive the multiple image croppings according to user selections. Through a user interface, for instance, a user may select to have multiple image croppings derived at different sizes. A user may also select through the user interface to have multiple image croppings derived at a same size. Alternately or in addition, the user interface may enable a user may specify a shape (square, circle, rectangle, user drawn, and so on) according to which an image is cropped. In some implementations, the image cropping module 110 may derive the multiple image croppings without user input to specify how a user would like an image cropped. For example, the image cropping module may derive multiple different sized croppings (or multiple croppings of a same size) of an image automatically, such as according to default settings. The multiple croppings derived from an image may be considered "candidate" croppings because some of those croppings may eventually be chosen to present to a user while others are not.

Given multiple croppings of an image, the image cropping module 110 may perform a variety of acts to suggest one or more of those croppings, such as by presenting them through a user interface. As mentioned briefly above and described in more detail below, the image cropping module 110 may employ the composition quality module 204, the content preservation module 206, and the boundary simplicity module 208 to score each of the croppings derived from a given image. Once the multiple croppings are scored, the image cropping module 110 may combine the scores for a respective cropping into a single score for the cropping.

In one or more implementations, the score for an image cropping may be computed as a function of the composition quality of the cropping, the content preservation of the cropping, and/or the boundary simplicity of the cropping. For example, the score for an image cropping (S(C)) may be computed according to the following:

$$S(C)=w_1 \times S_{composition}+w_2 \times S_{content}+w_3 \times S_{simplicity}$$

The term $S_{composition}$ represents a quantitative score indicative of a composition quality of a cropping. The term $S_{content}$ represents a quantitative score indicative of salient content preserved by a cropping. The term $S_{simplicity}$ represents a quantitative score indicative of a simplicity of cropping's boundary.

In the equation above, w1, w2, and w3 are weights applied respectively to the terms $S_{composition}$, $S_{content}$, and $S_{simplicity}$. These weights may be learned by the image cropping module 110 over time, e.g., using photographs to train the image cropping module (or components thereof), based on which croppings suggested to a user are selected by the user, and so on. These weights may also be set by a user according to personal preference. For example, a user may give more importance to the composition of a cropping. Accordingly, the user may select to more heavily weight $S_{composition}$. If a user finds that it is important for a cropping to preserve the content of an image or to have a simple boundary, however, the user may select to more heavily weight $S_{content}$ or $S_{simplicity}$.

Although the equation specified above to compute S(C) has a linear functional form, the image cropping module 110 may also be configured compute S(C) using a non-linear function (not shown). Furthermore, the image cropping module 110 may be configured to compute the score for an image cropping using a subset of the composition quality of the cropping, the content preservation of the cropping, and the boundary simplicity of the cropping. For example, the image cropping module 110 may compute S(C) as a function of just its composition quality and boundary simplicity. Alternately, the image cropping module 110 may compute S(C) as a function of just a single parameter, e.g., a function of just the composition quality of the cropping, just the content preservation of the cropping, or just the boundary simplicity of the cropping. In one or more implementations, the image cropping module 110 may compute S(C) using parameters in addition to the composition quality of the cropping, the content preservation of the cropping, and the boundary simplicity of the cropping.

Once score S(C) is computed for each of the multiple candidate croppings, the image cropping module 110 may rank the croppings according to the score. Given one-hundred (100) candidate croppings of an image, for instance, the image cropping module 110 may rank the croppings from one (1) to one-hundred (100). Assuming that the first ranked cropping is the "best" cropping, the image cropping module 110 may suggest at least that cropping.

Although the second "best" (the number two ranked cropping) may, based on the score, be the second most visually pleasing cropping, it may not be appreciably different from best cropping. This is because the second best cropping may be taken from a similar sub-region of an image as the best cropping, and therefore include much of the same content, in substantially a same location. In other words, the second best cropping may be scored highly for the same reasons that the best cropping is scored highly. Accordingly, the second best cropping may not be suggested. Instead, a cropping may be suggested that has different visual characteristics from the best cropping.

To suggest a cropping that is visually different from the first cropping, the image cropping module 110 may skip over croppings that are determined to be too similar to the top-ranked cropping. The image cropping module 110 may determine whether croppings are similar, one to another, using the individual parameters indicative of a cropping's visual characteristics, such as the composition quality of the cropping, the content preservation of the cropping, and the boundary simplicity of the cropping. Having a similar score for each of these parameters may indicate that croppings are visually similar.

Location of croppings may also be used to determine a similarity between the croppings. Location may be used to determine an amount of overlap between two croppings, e.g., a number of same pixels in the two images. If the amount of overlap between two croppings is above a threshold, the croppings may be determined too similar. For example, a candidate cropping may have a certain number of pixels that are the same as an already-chosen cropping. If that number of pixels exceeds the threshold amount (e.g., 90% of the candidate cropping's pixels), then the image is determined too similar to the already chosen cropping, and is not chosen. The overlap may be computed as an area of intersection or area of union of two croppings Regardless of how similarity is determined, in the continuing example, croppings ranked two (2) through ten (10) may be determined to be too similar to the top-ranked cropping based on some similarity measure. Thus, those croppings may not be suggested. However, the image cropping module 110 may determine that the eleventh-ranked cropping is appreciably different from the top-ranked cropping, e.g., based on the visual characteristics of the cropping. Consequently, the eleventh-ranked cropping may be suggested. For the same reason that the second-ranked cropping is not suggested, the twelfth-ranked cropping also may not be suggested (e.g., it is visually indistinct from the eleventh-ranked cropping). The image cropping module 110 may continue in this fashion and thereby choose a number of candidate croppings to suggest to a user.

In some implementations, the image cropping module 110 may choose candidate croppings with respect to a threshold. For example, the image cropping module 110 may be limited to choosing from candidate croppings that have at least a threshold score or scores. For example, the image cropping module 110 may be limited to choosing from among the candidate croppings having a combined score S(C) above a threshold value. The image cropping module 110 may also be limited to choosing from candidates having scores above a threshold value for each of terms $S_{composition}$, $S_{content}$, and $S_{simplicity}$. Further, the image cropping module 110 may be limited to choosing from candidate croppings that have at least a threshold rank. For example, the image cropping module 110 may be limited to choosing from croppings that are ranked in the top fifty percent of the candidate croppings.

Once croppings are chosen from among the candidate croppings, they may be presented to a user. The croppings may be suggested through a user interface of a photo-editing application, for example. To do so, the user interface of the photo-editing application may present cropping windows over the image that is to be cropped as in FIG. 3. Through the user interface, a user may select a suggested cropping. The image may then be cropped according to and as a result of the selection. The user interface may also enable a user to select more than one suggested cropping. When multiple croppings are selected, the multiple selected croppings may be effective to create multiple resulting images (e.g., separate image files)

Additionally, croppings may be suggested through a user interface used to view a scene in real-time. For example, a device (e.g., a camera, a phone, and so on) may display a particular interface for capturing images. In addition to including the scene that is to be captured, the user interface may also display suggested croppings of the scene. The user interface may enable a user to select one of those croppings. As a result of the selection, the device (e.g., the camera, the phone, and so on) may capture an image of the scene according to the selected cropping. The user interface may also be configured to instruct a user to perform actions with the device to enable the device to capture an image according to a suggested cropping. For example, the user interface may instruct the user to zoom in, zoom out, pan left, pan right, pan up, pan down, adjust the exposure level, and so on. Once the user has performed such actions, the user interface may then present windows that indicate the suggested croppings, and enable the user to select a suggested cropping to capture the image according to the selected cropping.

Having discussed the general functionality of the image cropping module 110, the composition quality module 204, the content preservation module 206, and the boundary simplicity module 208, which are employed to score the multiple candidate croppings, are now discussed.

The Composition Quality Module

The composition quality module 204 represents functionality to determine a composition quality of a respective cropping. To determine a composition quality of a cropping, the composition quality module 204 may utilize a classifier that is trained to recognize features of well-composed images. Rather than hard-coding general cropping rules (e.g., the rule-of-thirds, balancing elements, leading lines, and so on), rules may be mined from a data set of professional photographs that are already determined to be well-composed. Given a data set D of well-composed professional photos, the classifier may extract not only rules (e.g., the rule-of-thirds, balancing elements, leading lines, and so on) from those photos, but also knowledge as to when those rules may be broken. Using a large set of photos that are already determined to be well-composed to train the classifier also has the advantage of being able to avoid using human cropped photos, which are expensive to acquire in terms of both time and resources.

To train the classifier, the data set D of well composed photos is first augmented with negative examples e.g., photos that are not considered to be well-composed. The negative examples are used to ensure a discriminative model, which enables differentiation between well-composed photos and those that are not well-composed. To derive the negative examples, cropping windows may be randomly drawn over sub-regions of the well-composed photos. Since the windows are randomly drawn on sub-regions of an image already determined to be well-composed, it is assumed that the sub-regions corresponding to those windows do not result in well-composed images.

Saliency maps may then be derived for each of the random croppings as well as for the original images using a saliency method, and are also be used to extract spatial-pyramid features for the croppings and original images. In one example, three levels of a spatial-pyramid are built, each splitting the image into grids of 2×2, 4×4, and 8×8 areas. For each of the areas in each grid, the saliency values in each grid are averaged. The averages determined for each of the grids are then combined into a single feature vector. The features extracted from the well-composed photos D are considered to be positive examples of those features. In contrast, features extracted from the random croppings are considered to be negative examples of those features. In any case, both positive and negative examples may be represented by respective vectors. The vectors derived for each of the features of each image in the training set and for the random croppings may then feed a support vector regression model.

Using the model, candidate croppings may be scored according to the features present in a candidate cropping. The presence of positive features in a candidate cropping may be effective to increase its composition score, while the presence of negative features may be effective to decrease its composition score. Given an input image I and a candidate cropping C the composition score $S_{composition}$ may be computed as follows:

$$S_{composition} = f_{avr}(I, C)$$

In this equation, $f_{avr}( )$ represents a function to score the cropping C of image I using the vector regression model discussed above. Although a vector regression model is discussed, other models capable of identifying features indicative of a well-composed photo and features indicative of a photo that is not well-composed may be used within the spirit and the scope of the techniques described herein. For example, a neural network may be used in addition to or instead of the vector regression model.

Although training the classifier using a large data set of well-composed photos is discussed above, a classifier may be updated with a user's own photos, or with photos that a user likes e.g., those of a friend whose photography the user admires, or a professional photographer whose photograph the user admires. In this way, the classifier utilized by the composition quality module 204 may be trained to recognize features similar to those in images the user likes. Consequently, the presence of such features in a cropping may increase its composition score.

Figure 3:
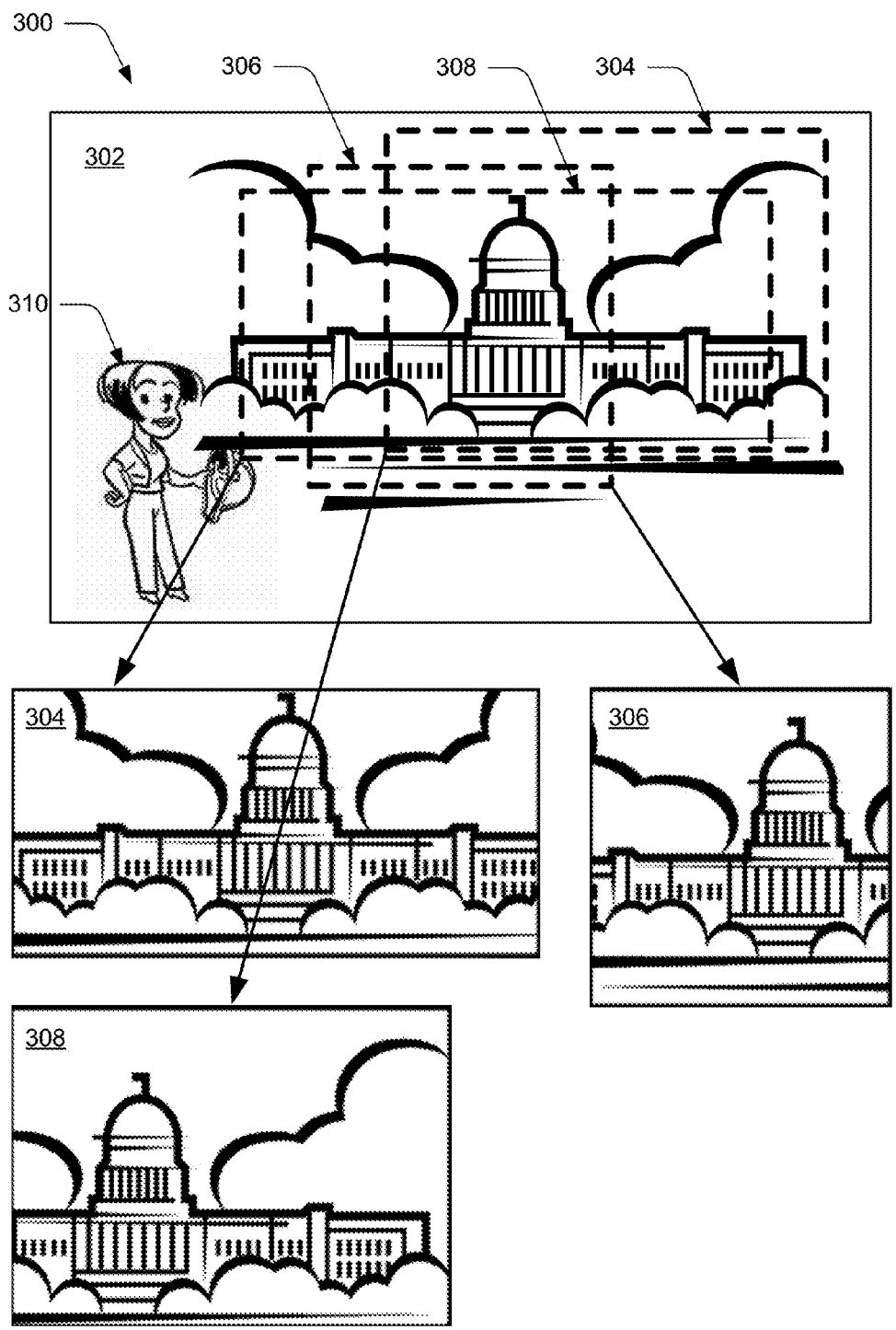
FIG. 3 illustrates an example of an image and croppings that may be derived from the image based on composition quality characteristics.

FIG. 3 illustrates at 300 an example of an image and croppings that may be derived from the image based on composition quality characteristics. In particular, FIG. 3 depicts image 302, and croppings 304, 306, 308. Utilizing a classifier such as that discussed above, the composition quality module 204 may compute composition scores for multiple croppings derived from the image 302. The model to which the multiple croppings are compared may indicate that croppings 304, 306, 308 exhibit features indicative of well-composed photos. For example, the croppings 304, 306, 308 may adhere generally to rules learned from a training data set of photos determined to be well-composed. Although the croppings 304, 306, 308 may adhere to the rules learned from the training set, and thus be considered "well-composed", each of the croppings 304, 306, 308 is missing person 310, which may be a salient feature of image 302. To ensure salient features of an image are included in croppings, content preservation techniques may be employed.

Content Preservation Module

The content preservation module 206 represents functionality to determine whether an image cropping preserves salient content of a respective image cropping. To determine whether salient content in an image is preserved, the content preservation module 206 may determine which features in an image correspond to salient content, e.g., people included in an image. Salient content may be identified from a saliency map of the image. Once the salient content is identified, the content preservation module 206 may determine portions of that content that are included in a cropping of the image. The content preservation score $S_{content}$ represents a ratio of the salient content included in a cropping C to that of the image I, from which the cropping is derived. The content preservation score may be computed as follows:

$$S_{content} = \frac{\sum_{(i,j) \in C} sal(i, j)}{\sum_{(i,j) \in I} sal(i, j)}$$

In this equation (i, j) may represent coordinates for pixels of the respective cropping or image. Given this equation, a content preservation score closer to one (1) indicates that a cropping preserves a greater amount of salient content than a score closer to zero (0). In other words, the equation is used to compute a percentage of saliency value inside a cropping. The equation may indicate a degree of preservation of content by a candidate cropping. By including the content preservation score as one of the parameters for calculating a cropping's score, important content of the original image may be preserved in suggested croppings.

Figure 4:
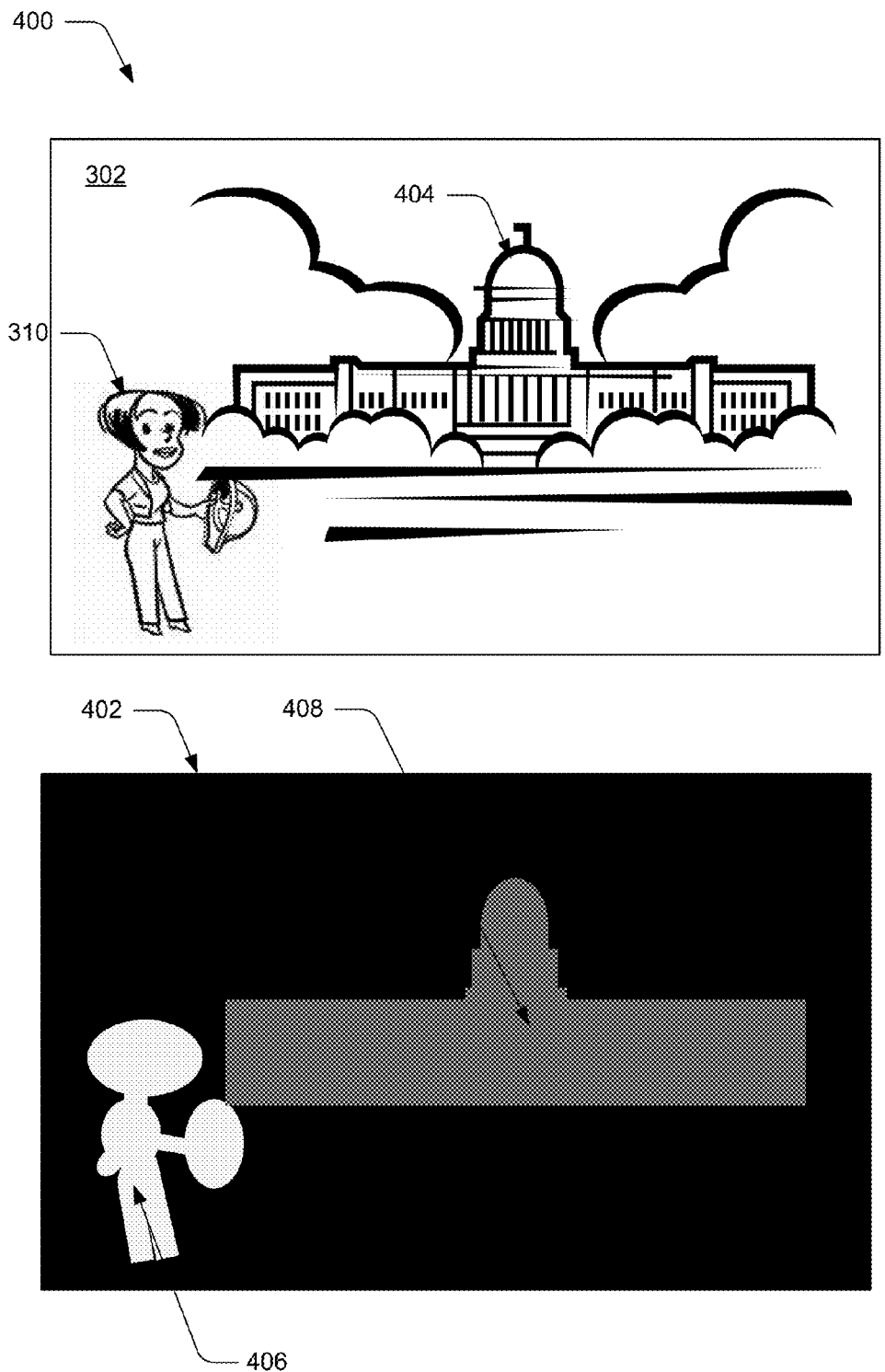
FIG. 4 illustrates an example of information derived from an image that may be used to crop the image according to content preservation characteristics.

FIG. 4 illustrates an example of information derived from an image that may be used to crop the image according content preservation characteristics. In particular, FIG. 4 illustrates at 400 image 302 from FIG. 3 and a representation 402 of a saliency map that may be derived from the image 302. As noted in the discussion of FIG. 3, image 302 includes the person 310. The image 302 also includes monument 404. In the saliency map, the person 310 is represented by corresponding shape 406 and monument 404 is represented by corresponding shape 408. The corresponding shapes 406, 408 in the representation 402 of the saliency map indicate that the person 310 and the monument 404 are salient (e.g., important) content of image 302. Consequently, a cropping of image 302 that includes both the person 310 and the monument 404 may have a higher (better) content preservation score than a cropping that includes neither the person 310 nor the monument 404 or a cropping that includes just one of them. In other words, a cropping that incorporates more content that is determined to be salient than another cropping will have a higher content preservation score. Methods other than determining a ratio of salient content included in cropping C to that in image I may be used to calculate a content preservation score without departing from the scope of the techniques described herein.

Boundary Simplicity Module

The boundary simplicity module 208 represents functionality to determine a measure of simplicity of a cropping's boundary. Given multiple croppings of an image, the boundaries of croppings are likely to cut through objects included in the image. When the boundary of a cropping cuts through objects of an image the result may be a cropping that is visually unpleasant. Consequently, cropping boundaries that pass through simple regions of an image are preferred to those that pass through complex regions.

The simplicity score $S_{simplicity}$, computed by the boundary simplicity module 208, may be based on image gradient of the candidate croppings and a ranking of candidate croppings. For a particular image I, the boundary simplicity module may first extract gradient map $I_{grad}$ of a blurred vision of image I. In a gradient map of a blurred of image, gradient changes may be effective to represent different objects. Thus, when the boundary of a cropping passes through a gradient change it may indicate that the boundary cuts through an object. The change in gradient between an object that is distinct and one that is not may be greater than the change between two objects that, relatively, are not distinct.

Once gradient map $I_{grad}$ is extracted, the average gradient values along the boundary are calculated for each candidate cropping. Given the average gradient values for the boundary of each candidate cropping, the boundary simplicity module 208 may rank the candidate croppings in ascending order. Using this technique to determine boundary simplicity, the simplicity score $S_{simplicity}$ may be computed according to the following:

$$S_{simplicity} = \frac{rank_{ascend}(avg(grad_{up} + grad_{bottom} + grad_{left} + grad_{right}))}{number\ of\ cropping\ candidates}$$

This formula represents a technique to compute the simplicity score for a four-sided cropping, such as a rectangle. Thus, the terms $grad_{up}$, $grad_{bottom}$, $grad_{left}$, and $grad_{right}$ may represent, respectively, the average gradient of the upper side, bottom side, left side, and right side of a rectangular cropping's boundary.

Use of the average gradient for a boundary is but one example of a measure that may be used to determine boundary simplicity. Other measures may also be used to determine boundary simplicity for candidate croppings. Such measures may be effective to measure the complexity of an image along the boundary of a candidate cropping. For example, the simplicity of a boundary may be determined using entropy along a cropping line. Alternately or in addition, an image edge map may be used to determine the simplicity for a boundary. To this end, both low and high level measures, such as color and category, can be used to extract a simplicity score for an image cropping. Regardless of the measure used to extract a simplicity score to encode the simplicity for each cropping candidate, the boundary simplicity module 208 may rank each of the candidates according to the score. The boundary simplicity module 208 may then normalize the score by dividing by the number of cropping candidates.

Figure 5:
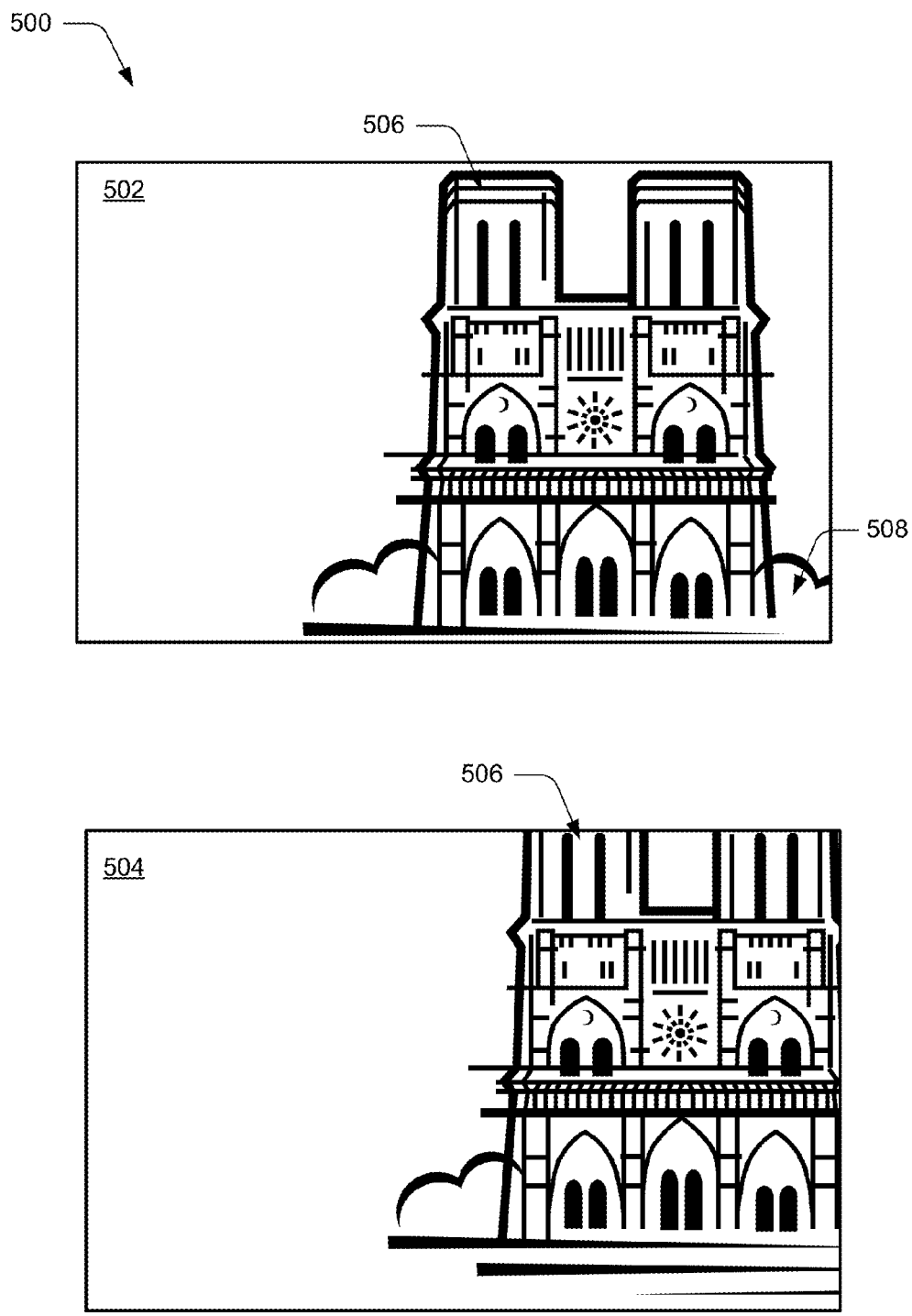
FIG. 5 illustrates examples of image croppings having different boundary simplicity characteristics.

FIG. 5 illustrates at 500 examples of image croppings having different boundary simplicity characteristics. Croppings 502, 504 represent different candidate croppings of an image (not shown). Further, both croppings 502, 504 include church 506. However, the boundary of cropping 502 may be considered to be simpler than that of cropping 504. This is because the boundary of cropping 504 cuts through both towers of the church 506 and cuts through the side of the church 506. In contrast, the boundary of cropping 502 does not cut through portions of the church 506. Instead, the boundary of cropping 502 appears to cut mostly through space and through some bushes 508. In any case, the boundary of cropping 502 cuts through fewer distinct objects of the image than cropping 504. Consequently, cropping 502 is preferred to cropping 504, which would be reflected in the simplicity score $S_{simplicity}$ computed for each of these candidate croppings.

Having discussed example details of the techniques for cropping boundary simplicity, consider now some example procedures to illustrate additional aspects of the techniques.

Example Procedures

This section describes example procedures for cropping boundary simplicity in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed by a suitably configured device, such as example computing devices 102, 202 of FIGS. 1 and 2 that make use of an image cropping module 110.

Figure 6:
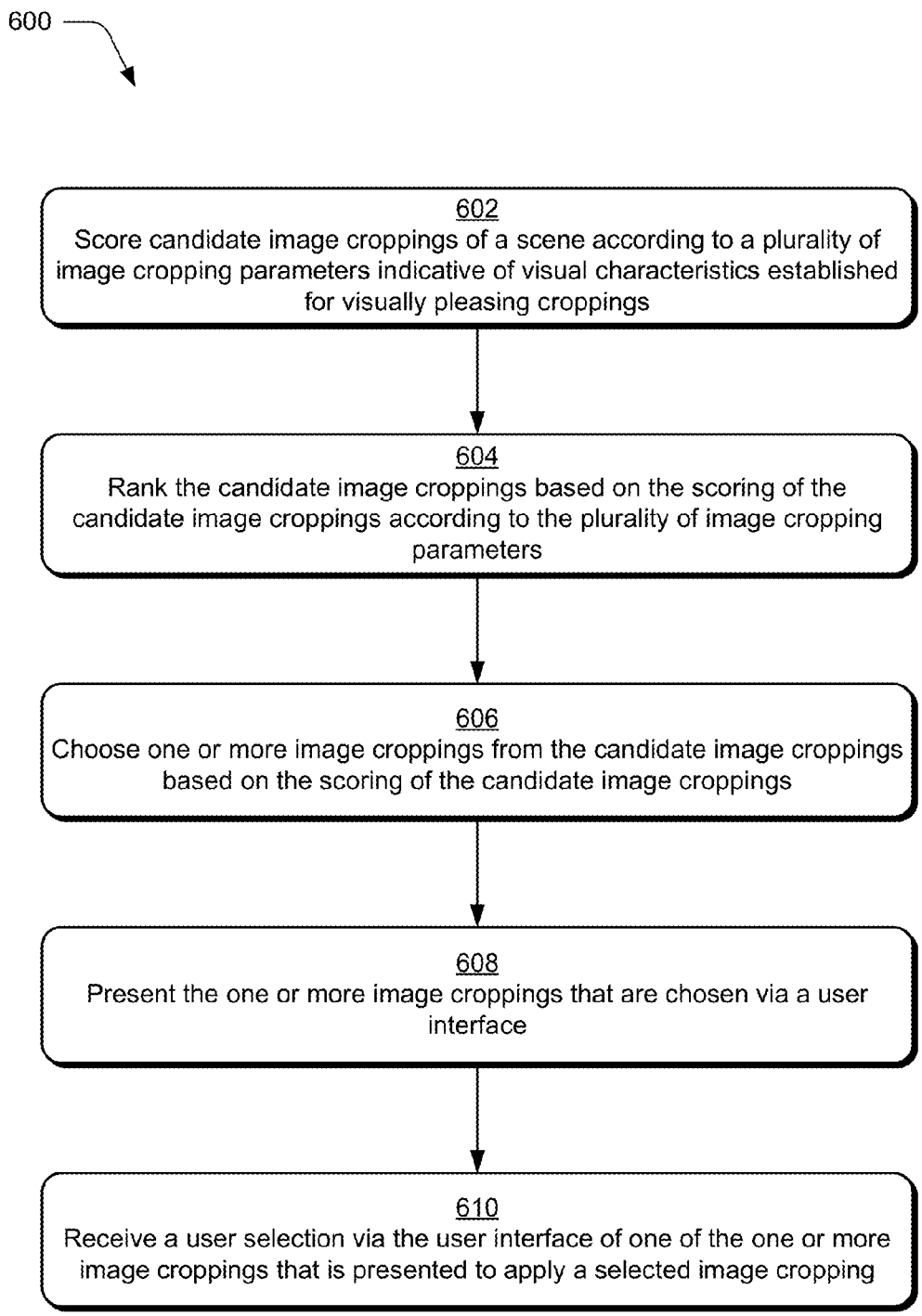
FIG. 6 is a flow diagram depicting a procedure in an example implementation in which candidate image croppings of a scene are scored according to a plurality of image cropping parameters and presented to a user for selection.

FIG. 6 depicts an example procedure 600 in which candidate image croppings of a scene are scored according to a plurality of image cropping parameters and presented to a user for selection. Once the candidate croppings of a scene are derived, those croppings are scored according to a plurality of image cropping parameters, which are indicative of visual characteristics established for visually pleasing croppings (block 602). For example, the image cropping module 110 employs the composition quality module 204, the content preservation module 206, and the boundary simplicity module 208 to provide a score for each of the candidate image croppings. Each of these modules computes a score for a given cropping parameter that is indicative of visual characteristics of the cropping. The composition quality module 204, for instance, provides a score indicative of a candidate cropping's composition quality (e.g., whether the candidate cropping includes features associated well-composed images or not).

According to the scoring, the candidate image croppings are ranked (block 604). For example, the image cropping module 110 combines the scores, calculated by the composition quality module 204, the content preservation module 206, and the boundary simplicity module 208 for an individual cropping, using the linear combination discussed above. As also discussed above, the image cropping module 110 can instead combine such scores using a non-linear model. Once the scores are combined so that each candidate cropping has a single score, the image cropping module 110 ranks the candidate croppings according to those scores.

Image croppings are chosen from the candidate image croppings based on the scores of the candidate image croppings (block 606). For example, the image cropping module 110 chooses the top-ranked candidate cropping. The image cropping module 110 then removes candidate croppings that are too similar (e.g., overlap the chosen cropping more than a threshold amount) from consideration. The image cropping module 110 then chooses the highest remaining cropping candidate. The image cropping module 110 repeats this process until a number of cropping candidates are chosen. In one or more implementations, the number of candidates chosen may be based on user input indicating how many croppings the user would like suggested. The number of candidates that are chosen may also be based on stored settings (e.g., configuration settings of an application).

The image croppings that are chosen are presented via a user interface (block 608). Once the image cropping module 110 chooses a number of croppings from among the candidate croppings, the chosen croppings are presented to a user through a user interface (not shown). The croppings may be presented, for instance, by overlaying cropping windows on the image that is to be cropped. The user interface may enable a user to cycle through the suggested croppings one at a time. Alternately, each of the suggested croppings may be presented through the user interface at a same time. When each of the suggested croppings is presented at the same time, the croppings may be distinguished, such as by making the cropping window of each cropping a different color, using a different pattern (e.g., dashed lines) for each of the croppings, and so on.

Through the user interface, a selection of an image cropping is received to apply a crop according to the selection (block 610). For example, a user may select one of the suggested croppings with a cursor. A user may also select one of the croppings by cycling through the croppings using a first control (e.g., an arrow button) and then confirming that the cropping on which the user has stopped cycling is to be selected using another control (e.g., an "OK", "Enter", or "Return" button). Once a candidate cropping is selected, the cropping may be applied. For example, the image cropping module 110 crops the image according to the selected cropping by removing (or hiding) portions of the image outside of the selected cropping window and retaining the portions within.

Figure 7:
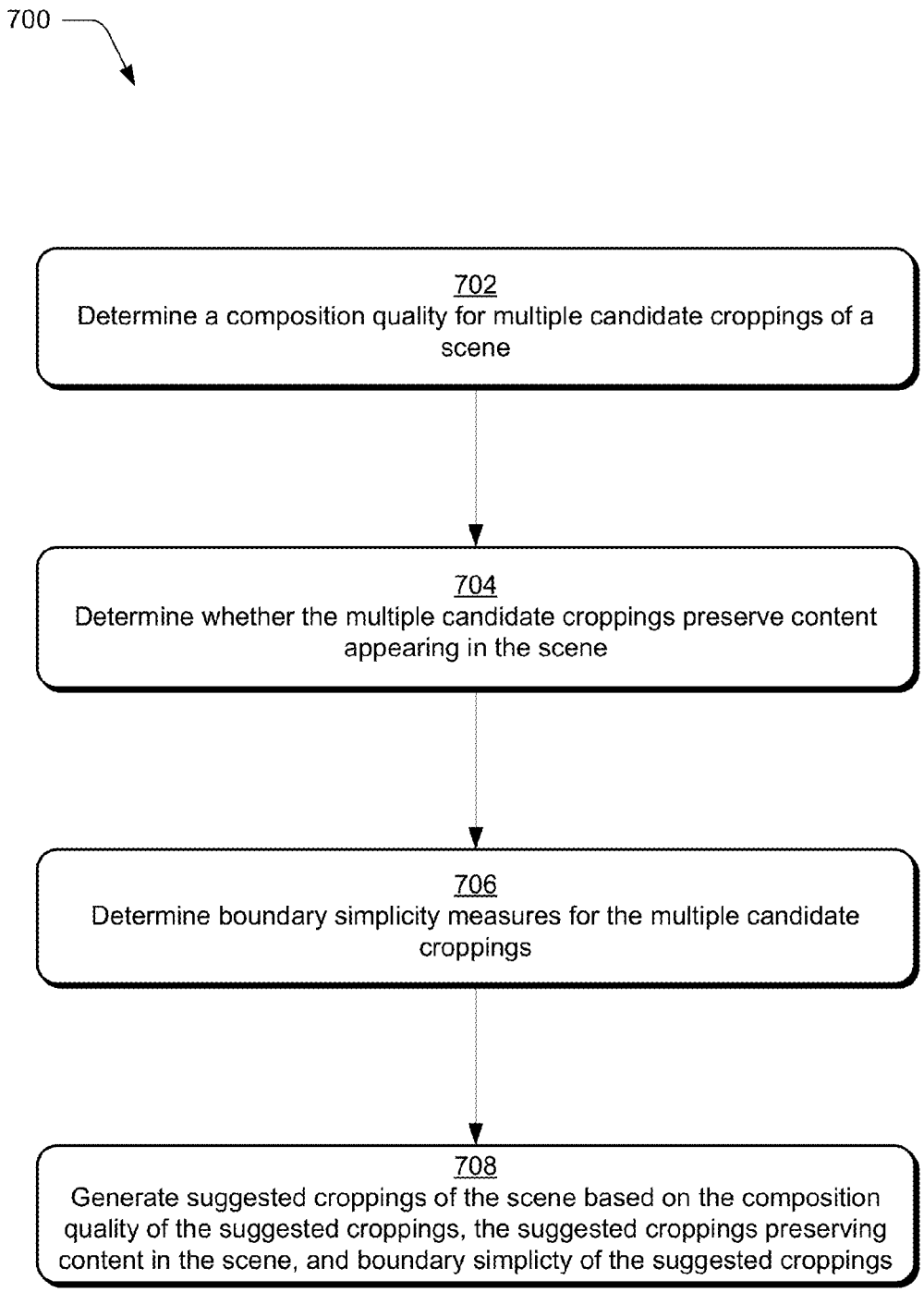
FIG. 7 is a flow diagram depicting a procedure in an example implementation in which suggested croppings of a scene are generated based on composition quality, content preservation, and boundary simplicity of the suggested croppings.

FIG. 7 depicts an example procedure 700 in which suggested croppings of a scene are generated based on composition quality, content preservation, and boundary simplicity of the suggested croppings. To generate the suggested croppings, a composition quality is determined for each of multiple candidate croppings of a scene (block 702). For example, the image cropping module 110 employs the composition quality module 204 to calculate a composition score $S_{composition}$ for each of the candidate croppings. The composition score is indicative of whether features of a candidate cropping positively correlate to rules learned by training a discriminative model.

A determination is made regarding whether each of the candidate croppings of the scene preserves content appearing in the scene (block 704). For example, the image cropping module 110 employs the content preservation module 206 to calculate a content preservation score $S_{content}$ for each of the candidate croppings. The candidate preservation score is indicative of how much (e.g., what percentage of) salient content of an image is preserved in a given candidate cropping.

For each of the candidate croppings of the scene, boundary simplicity measures are determined for the cropping's boundary (block 706). For example, the image cropping module 110 employs the boundary simplicity module 208 to calculate a simplicity score $S_{simplicity}$ for the boundary of each cropping candidate. The boundary simplicity score is indicative of how simple a candidate cropping's boundary is relative to that of other candidate croppings.

Suggested croppings of the scene are generated based on the composition quality of those croppings, the content preserved by the suggested croppings, and the boundary simplicity of those croppings (block 708). For example, the image cropping module 110 combines the composition score, the content preservation score, and the simplicity score into a single score for each candidate cropping. The image cropping module 110 then ranks the candidate croppings according to the combined scores. Once ranked, the image cropping module 110 chooses which of the candidate croppings to suggest based on the rank of the candidate croppings and how similar unchosen candidate croppings are to those that have already been chosen.

Having described example procedures in accordance with one or more implementations, consider now an example system and device that can be utilized to implement the various techniques described herein.

Example System and Device

Figure 8:
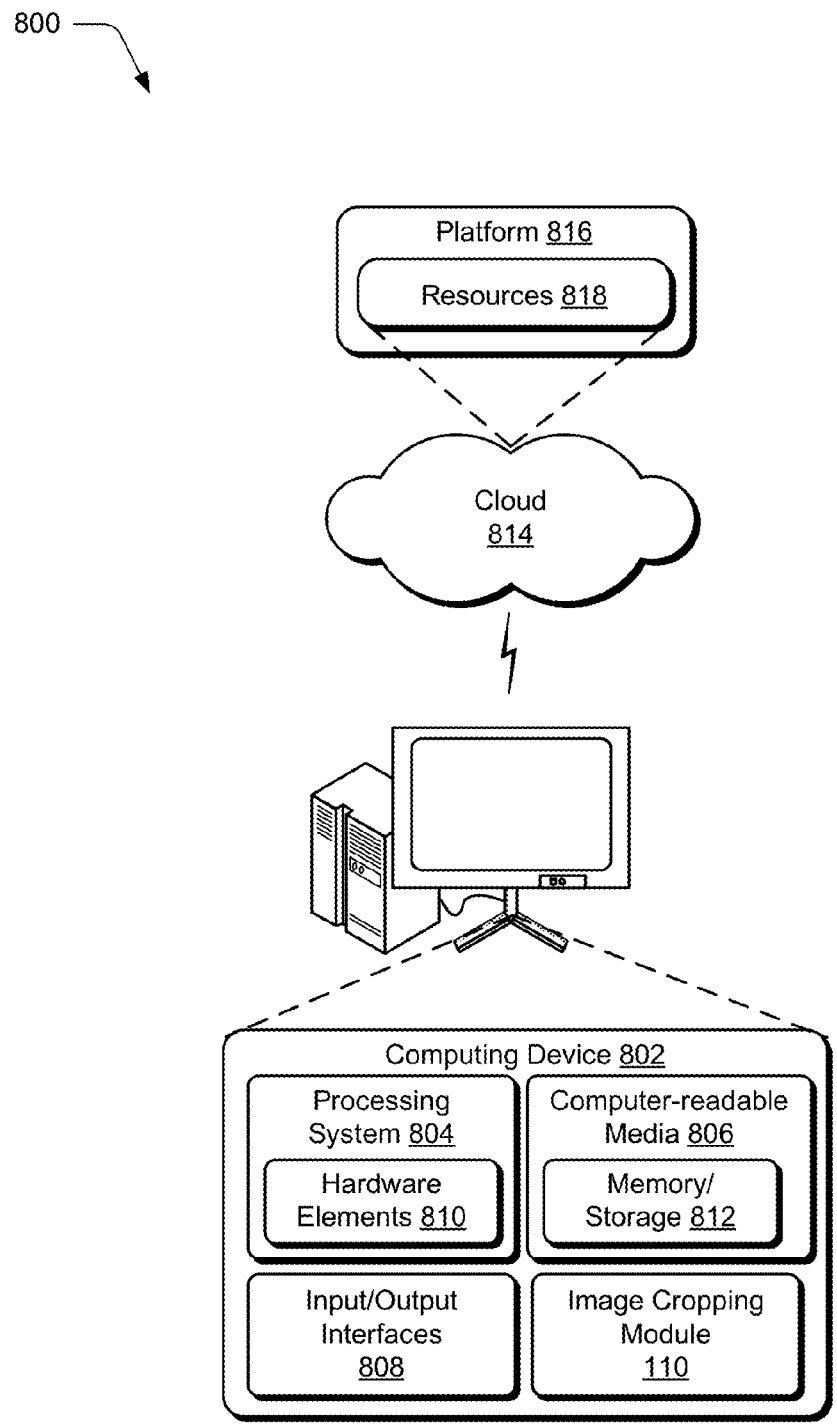
FIG. 8 illustrates an example system including various components of an example device that can be employed for one or more implementations of cropping boundary simplicity techniques described herein.

FIG. 8 illustrates an example system generally at 800 that includes an example computing device 802 that is representative of one or more computing systems and/or devices that may implement the various techniques described herein. This is illustrated through inclusion of the image cropping module 110, which operates as described above. The computing device 802 may be, for example, a server of a service provider, a device associated with a client (e.g., a client device), an on-chip system, and/or any other suitable computing device or computing system.

The example computing device 802 includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device implementation, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    calculating, for candidate croppings of a scene, scores indicative of a boundary simplicity for each of the candidate croppings, including:
        ranking the candidate croppings according to values derived for the candidate croppings that indicate a complexity of the scene along a boundary of a candidate cropping, and
        calculating the scores indicative of the boundary simplicity as normalized scores for the candidate croppings based on the ranking; and
    choosing one or more croppings from the candidate croppings based, at least in part, on the scores calculated for the candidate croppings that are indicative of the boundary simplicity.

2. A method as described in claim 1, wherein calculating the scores indicative of the boundary simplicity includes:
    measuring the complexity of the scene along the boundary of each respective cropping of the candidate croppings to derive the values indicative of the complexity.

3. A method as described in claim 2, wherein the complexity of the scene along the boundary of each respective cropping is measured using at least one of an average gradient of the boundary, an image edge map, or entropy along the boundary.

4. A method as described in claim 2, wherein calculating the scores as the normalized scores includes dividing a rank corresponding to each respective cropping by a number of candidates to normalize the score calculated for each respective cropping.

5. A method as described in claim 1, wherein the one or more croppings are chosen solely based on the scores indicative of the boundary simplicity, and the one or more croppings that are chosen include a cropping having a score which indicates that said cropping has a simplest boundary of the candidate croppings.

6. A method as described in claim 1, further comprising calculating, for the candidate croppings of the scene, additional scores indicative of at least one visual characteristic of each respective cropping other than boundary simplicity.

7. A method as described in claim 6, wherein the one or more croppings are chosen from the candidate croppings based on the scores indicative of the boundary simplicity and the additional scores indicative of the at least one visual characteristic other than boundary simplicity.

8. A method as described in claim 6, wherein the additional scores that are calculated for the candidate croppings of the scene are indicative of a composition quality of each respective cropping, the composition quality determined based on a comparison of each respective cropping to composition properties derived from well-composed images.

9. A method as described in claim 6, wherein the additional scores that are calculated for the candidate croppings of the scene are indicative of whether at least a portion of content appearing in the scene is preserved by each respective cropping.

10. A method as described in claim 1, further comprising:
    presenting the one or more croppings that are chosen via a user interface;
    receiving a selection via the user interface of one of the one or more croppings that is presented; and
    cropping an image of the scene according to the selected cropping.

11. A method as described in claim 1, further comprising:
    presenting the one or more croppings that are chosen via a user interface;
    receiving a selection via the user interface of one of the one or more croppings that is presented; and
    capturing an image of the scene according to the selected cropping.

12. A method as described in claim 1, further comprising ranking the candidate croppings according to the scores calculated for the candidate croppings, the one or more croppings that are chosen not being consecutively ranked candidate croppings.

13. A method as described in claim 1, further comprising ranking the candidate croppings according to the scores calculated for the candidate croppings, the one or more croppings that are chosen including a highest ranked candidate cropping and excluding a next highest ranked candidate cropping.

14. A method as described in claim 1, wherein choosing the one or more croppings includes choosing multiple croppings that are visually different, one from another, based on an amount of overlap between the multiple croppings.

15. A method implemented by a computing device, the method comprising:
    generating multiple candidate croppings of a scene;
    measuring, for each of the multiple candidate croppings, complexity of the scene along a boundary of said candidate cropping to derive a value indicative of boundary complexity;
    ranking the candidate croppings according to boundary complexity values derived for each of the candidate croppings, the candidate croppings having boundary complexity values indicative of a less complex boundary being ranked more favorably than the candidate croppings having boundary complexity values indicative of a more complex boundary; and
    calculating a normalized score for the candidate croppings based on the ranking, the normalized scores being used to choose one or more croppings from the candidate croppings for display via a user interface as suggested croppings of the scene.

16. A method as described in claim 15, wherein the normalized score calculated based on the ranking of boundary complexity values is used with additional scores indicative of other visual characteristics to choose the one or more croppings from the candidate croppings.

17. A method as described in claim 15, wherein the complexity of the scene is measured along the boundary of said candidate cropping using at least one of an average gradient of the boundary, an image edge map, or entropy along the boundary.

18. A system comprising:
    one or more modules implemented at least partially in hardware, the one or more modules configured to perform operations comprising:
        ranking candidate croppings of a scene according to values derived for each of the candidate croppings that indicate a boundary simplicity of a respective cropping;
        calculating scores indicative of the boundary simplicity the candidate croppings as normalized scores based on the ranking, the calculated scores used to choose one or more of the candidate croppings as suggested croppings of the scene;
        displaying, via a user interface, one or more of the suggested croppings; and receiving, via the user interface, a selection of one of the one or more suggested croppings to apply a selected cropping of the scene.

19. A system as described in claim 18, wherein:

the user interface comprises part of an image editing application;

the scene is included as part of an image accessible to the image editing application; and the selection of the one said suggested cropping causes the image to be cropped according to the selected cropping.

20. A system as described in claim 18, wherein:

the scene can be viewed through the user interface in real-time; and the selection of the one said suggested cropping causes an image of the scene to be captured according to the selected cropping.

\* \* \* \* \*